United States Patent [19]

Lund

[11] Patent Number: 4,589,678

[45] Date of Patent: May 20, 1986

[54] ANTI-ROLL SYSTEM FOR A VEHICLE

[75] Inventor: Mark A. Lund, Escondido, Calif.

[73] Assignee: Allan J. Kuebler, Chula Vista, Calif.; a part interest

[21] Appl. No.: 713,777

[22] Filed: Mar. 19, 1985

[51] Int. Cl.[4] .......... B62D 9/02

[52] U.S. Cl. .......... 280/772; 280/673

[58] Field of Search .......... 280/772, 112 A, 689, 280/673, 675, 690, 688

[56] References Cited

U.S. PATENT DOCUMENTS

| | | | |
|---|---|---|---|
| 2,137,947 | 11/1938 | Moore | 280/772 |
| 2,976,052 | 3/1961 | Hanna | 280/112 A |
| 2,978,255 | 4/1961 | Rosenkrands | 280/112 A |
| 3,016,101 | 1/1962 | Fiala | 280/772 |
| 3,038,739 | 6/1962 | Vogel | 280/112 A |
| 3,598,385 | 8/1971 | Parsons, Jr. | 280/112 A |
| 3,752,497 | 8/1973 | Enke et al. | 280/112 A |
| 3,820,812 | 6/1974 | Stubbs et al. | 280/112 A |
| 3,871,681 | 3/1975 | Piniot | 280/701 |
| 3,885,809 | 5/1975 | Pitcher | 280/112 A |
| 3,893,680 | 7/1975 | Marcillat et al. | 280/6 H |
| 4,030,777 | 6/1977 | Rabenseifner | 280/714 |
| 4,054,303 | 10/1977 | de Kruyff | 280/689 |
| 4,076,275 | 2/1978 | Hiruma | 280/714 |
| 4,277,076 | 7/1981 | Hanna | 280/772 |
| 4,281,850 | 8/1981 | Studer | 280/689 |
| 4,345,661 | 8/1982 | Nishikawa | 280/772 |
| 4,354,567 | 10/1982 | Puchas | 180/73 C |

*Primary Examiner*—John J. Love
*Assistant Examiner*—Ross Weaver
*Attorney, Agent, or Firm*—Baker, Maxham & Jester

[57] ABSTRACT

First and second cross-bars extend laterally across the width of a vehicle and are pivotally connected intermediate their lengths in scissors fashion. One end of each cross-bar is pivotally connected to a wheel support assembly which is in turn pivotally connected to the vehicle body by a spring and damper assembly. The other end of the first cross-bar is pivotally connected to the vehicle body by a hydraulic cylinder and piston assembly. The other end of the second cross-bar is pivotally connected via a lever to the actuator of a variable flow hydraulic valve. Lateral forces exerted by the wheels and cross-bars relative to the vehicle body during a turn operate the hydraulic valve to send a proportionate amount of hydraulic fluid to the upper or lower portion of the hydraulic cylinder to thereby prevent rolling of the vehicle body.

20 Claims, 3 Drawing Figures

ANTI-ROLL SYSTEM FOR A VEHICLE

BACKGROUND OF THE INVENTION

The present invention relates to vehicle suspension systems, and more particularly, to a cross-bar hydraulic suspension system for preventing the roll of an automobile during turning.

When a vehicle is steered through a turn by a driver the vehicle is subjected to centrifugal forces tending to roll the vehicle body radially outwardly of a circular path of travel of the vehicle. Modern passenger cars often have soft suspension springs for a more comfortable ride. However in such cars the roll can develope into a large angle due to the roll moment produced during the turning of the vehicle, and excessive lateral inclination of the vehicle is experienced. As a result, the driver and passengers are subjected to more discomfort during the turn, and maneuverability and driving safety is also reduced.

Various anti-roll systems have been proposed for preventing a vehicle from rolling during a turn. However they either do not effectively limit the roll without sacrificing a smooth ride, or they are unduly complex and expensive.

U.S. Pat. No. 4,354,567 of Puchas and assigned to Daimler-Benz, AG, discloses a rear axle assembly including triangular tilted control arms which are employed to suspend the driven wheels from the body. When increased lateral forces act on the wheels during a turn, the effect produced is so-called "lateral force understeer."

U.S. Pat. No. 4,345,661 of Nishikawa and assigned to Honda, discloses an anti-roll system for a vehicle equipped with power steering for producing a steering reactive force modulated by the speed at which the vehicle is running. The system introduces pressurized hydraulic fluid for the steering reactive force into four individual shock absorber type assemblies connected with each wheel in a McPherson strut arrangement.

U.S. Pat. No. 4,281,850 of Studer discloses an anti-sway apparatus comprising a transverse beam elastically connected at each end with a transverse axle supported by leaf springs. The beam is in turn pivotally connected at each end to the vehicle body.

U.S. Pat. No. 4,277,076 of Hanna discloses a hydropneumatic anti-roll suspension system including a hydraulic actuator for suspending each wheel from the vehicle body and a spring accumulator.

U.S. Pat. No. 4,076,275 of Hiruma discloses a hydropneumatic vehicle suspension system for body height control including four hydraulic piston/cylinder assemblies.

U.S. Pat. No. 4,054,303 of deKruyff and assigned to General Motors discloses a stabilizer bar arrangement for the front end of a vehicle. It includes cross-bars secured at their outer ends to the oppositely disposed lower control arms and having juxtapositioned inner ends, with a slot formed in one cross-bar and a pin mounted in the other cross-bar and extending into the slot.

U.S. Pat. No. 4,030,777 of Rabenseifner and assigned to Volkswagenwerk, AG, discloses a suspension system having separate hydraulic cylinders for each wheel. The movement of the piston in each cylinder in response to different loadings of the associated wheel of the vehicle controls the flow of pressurized fluid to and from the device so as to maintain the piston within a predetermined range of positions relative to the cylinder.

U.S. Pat. No. 3,893,680 of Marcillat et al. discloses a device for limiting transverse leaning of a vehicle which utilizes pendulum type electric switches for controlling the flow of hydraulic fluid into and out of multiple cylinders.

U.S. Pat. No. 3,885,809 of Pitcher discloses an anti-roll suspension system in which a hydraulic strut for each wheel is controlled.

U.S. Pat. No. 3,871,681 of Piniot and assigned to Peugeot discloses a McPherson strut type assemblies supporting a pair of vehicle wheels, the assemblies being connected with a hydraulic pump for leveling or adjusting the trim of the vehicle.

U.S. Pat. No. 3,820,812 of Stubbs and assigned to Rover, discloses an active anti-roll suspension system including four hydraulic piston/cylinder assemblies acted upon by corresponding control units.

U.S. Pat. No. 3,752,497 of Enke et al. and assigned to Daimler-Benz, discloses another anti-roll suspension system including an actively controlled hydraulic piston/cylinder assembly for each wheel. A control valve is controlled during turns by a lateral acceleration pick-up.

U.S. Pat. No. 3,038,739 of Vogel discloses another anti-roll suspension system for a vehicle in which separate hydraulically controlled cylinders are connected between the supporting A-arms of an associated wheel.

U.S. Pat. No. 3,016,101 of Fiala and assigned to Daimler-Benz, discloses a system for improving the steering reaction of a vehicle. The system includes a hydropneumatic cylinder for each wheel, and the cylinders are operatively connected to a common control.

U.S. Pat. No. 2,976,052 of Hanna and assigned to Westinghouse, discloses another anti-roll system for a vehicle in which includes hydraulically controlled shock absorbers for each wheel.

Finally, U.S. Pat. No. 2,137,947 of Moore discloses another vehicle anti-roll system which includes a pair of double acting hydraulic shock absorbers that cooperate with a single transverse rear axle.

SUMMARY OF THE INVENTION

Accordingly, it is the primary object of the present invention to provide an improved anti-roll suspension system for a vehicle.

It is another object of the present invention to provide such a system which does not sacrifice ride smoothness.

It is another object of the present invention to provide such a system which is less complex than prior anti-roll suspension systems.

Yet another object of the present invention is to provide such a system which reacts more quickly upon entering a turn than prior anti-roll systems.

Still another object of the present invention is to provide such a system which is not adversely affected by bumps.

Another object of the present invention is to provide such a system which is less costly and more reliable than prior anti-roll systems.

Yet another object of the present invention is to provide such a system which operates proportionally to supply more roll resisting force on sharper turns and during turns taken at higher speeds.

Still another object of the present invention is to provide such a system which can be incorporated into conventional automobile designs with a minimum of structural modification.

Accordingly, in the illustrated embodiment of the present invention first and second cross-bars extend laterally across the width of a vehicle and are pivotally connected intermediate their lengths in scissors fashion. One end of each cross-bar is pivotally connected to a wheel support assembly which is in turn pivotally connected to the vehicle body by a spring and damper assembly. The other end of the first cross-bar is pivotally connected to the vehicle body by a hydraulic cylinder and piston assembly. The other end of the second cross-bar is pivotally connected via a lever to the actuator of a variable flow hydraulic valve. Lateral forces exerted by the wheels and cross-bars relative to the vehicle body during a turn operate the hydraulic valve to send a proportionate amount of hydraulic fluid to the upper or lower portion of the hydraulic cylinder to thereby prevent rolling of the vehicle body.

DESCRIPTION OF THE PREFERRED EMBODIMENT

Figure 1:
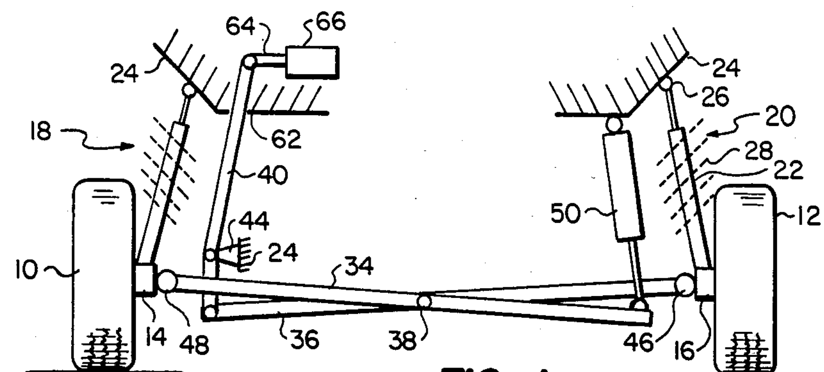
FIG. 1 is a diagrammatic front end elevation view illustrating a first portion of the mechanical components of a preferred embodiment of my invention adapted for use with McPherson strut type automotive suspension.

Referring to FIG. 1, a pair of front wheels 10 and 12 are each rotatably mounted on corresponding axle assemblies 14 and 16 which are in turn connected to the lower ends of a pair of spring and damper assemblies 18 and 20, respectively. Each of the spring and damper assemblies includes a shock absorber such as 22 whose upper end is pivotally mounted to the vehicle frame or body 24 with a rubber mount 26. A coil spring such as 28 surrounds each of the shock absorbers and is compressed between the vehicle body and the corresponding axle assembly as the corresponding wheel moves up and down relative to the vehicle body.

Figure 2:
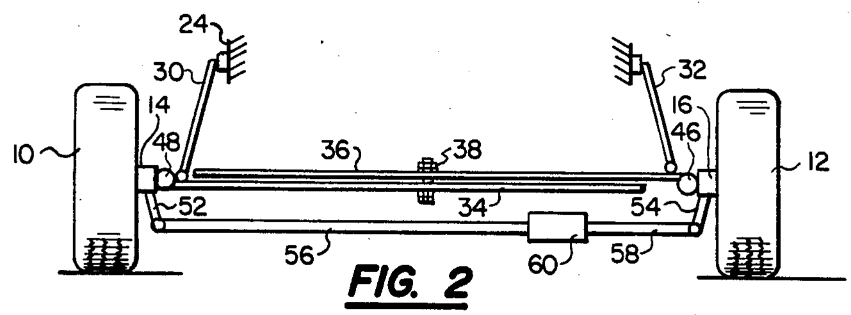
FIG. 2 is a diagrammatic top plan view illustrating a second portion of the mechanical components of the preferred embodiment. A control lever is not illustrated in this view.

Referring to FIG. 2, a pair of compression struts 30 and 32 pivotally connect the outer ends of corresponding cross-bars 34 and 36 to lower portions of the vehicle body or frame 24 on either side thereof. These compression struts maintain longitudinal location of the wheels relative to the vehicle body. The cross-beams 34 and 36 are pivotally connected intermediate their lengths in scissors fashion by a bolt and spacer assembly 38. Referring to FIG. 1, one end of the cross-bar 36 is pivotally connected to the lower end of a lever 40 which is in turn pivotally connected to the vehicle body 24 via pin and bracket assembly 44. The other end of the cross-bar 36 is pivotally connected to the axle assembly 16 via ball joint 46. One end of the other cross-bar 34 is pivotally connected to the other axle assembly 14 via ball joint 48. The other end of the cross-bar 34 is pivotally connected to the lower end of a hydraulic cylinder and piston assembly 50, the upper end of which is pivotally mounted to the vehicle body 24. This hydraulic assembly 50 is controlled as hereafter described to move the cross-beams in a manner that will prevent rolling of the vehicle body during a turn.

Referring to FIG. 2, a pair of steering arms 52 and 54 are connected to and extend forwardly from the axle assemblies 14 and 16, respectively. These arms are pivotally connected to links 56 and 58 which are moved transversely relative to the vehicle body by a power steering actuator 60.

Referring again to FIG. 1, the upper end of the lever 40 extends through an opening 62 in the vehicle body into the engine compartment. A movable actuator 64 of a hydraulic valve 66 is pivotally connected to the upper end of the lever 40. The valve is rigidly mounted to a suitable structure in the engine compartment and is used to control the flow of hydraulic fluid to and from the hydraulic piston and cylinder assembly 50. It will be understood that lateral movement of the wheels (left or right in FIG. 1) relative to the vehicle body will cause the lever 40 to pivot and move the actuator 64 of the valve 66 a proportional amount.

Figure 3:
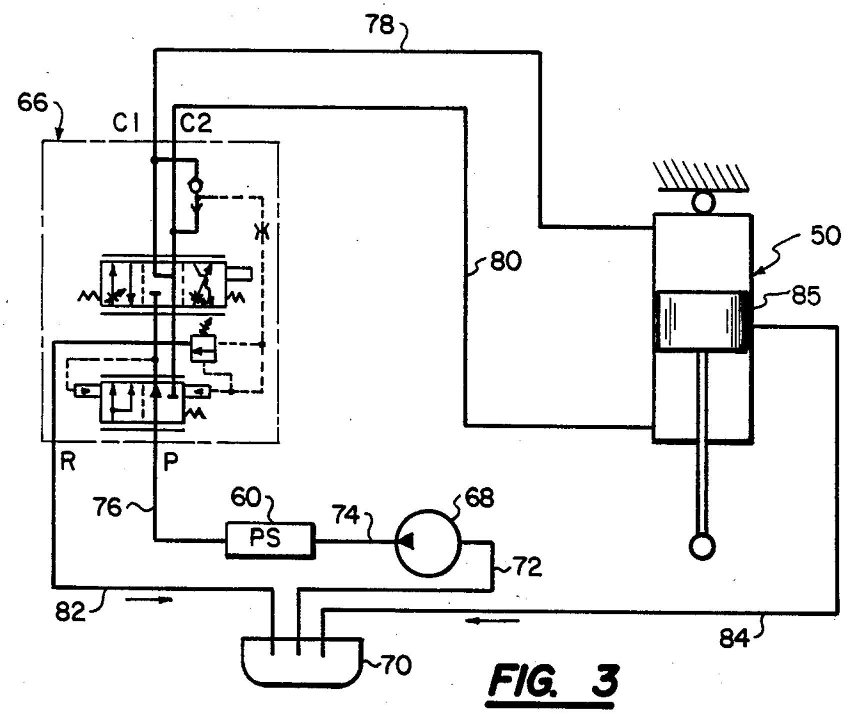
FIG. 3 is a schematic illustration of the hydraulic circuit of the preferred embodiment.

Referring to FIG. 3, the valve 66 is of the variable flow type and is more fully described in U.S. Pat. No. 3,602,104. Movement of the valve actuator 64 by the lever 40 in either direction from a neutral middle position causes a similar movement in the valve spool from its neutral position. This opens a variable orifice and establishes a direction of flow. A compensator piston automatically controls flow by maintaining a fixed pressure across the selected orifice opening. Notches machined in the directional control spool provide a variable orifice opening to the selected work port when the spool is shifted from its neutral position. Additional lands on the spool provide a path to the return port from the opposite work port completing the four-way valve action.

Referring still to FIG. 3, a hydraulic pump, such as the power steering pump 68, pumps hydraulic fluid from a reservoir 70 to the pressure inlet P of the valve 66 via conduits 72, 74 and 76 and power steering actuator 60. A port pressurized (spool out) outlet C1 of the valve is connected to one end of the hydraulic piston and cylinder assembly 50 via conduit 78. A port pressurized (spool in) inlet C2 of the valve is connected to the other end of the hydraulic piston and cylinder assembly 50 via conduit 80. A return outlet R of the valve 66 is connected via conduit 82 to the reservoir. Another conduit 84 connects a low pressure outlet form the hydraulic piston and cylinder assembly 50 to the reservoir. This low pressure outlet is covered and sealed by the piston 85 when the piston is in its intermediate position shown in FIG. 3. This occurs when both wheels 10 and 12 are in their normal positions. The length of the piston then limits the amount of correction possible during cornering. The outlet to the conduit 84 serves as a pressure relief valve. The system thus operates on relative position rather than relative pressure.

Having described the structure of the preferred embodiment of my invention, its operation will now be described. Assume that FIG. 1 is a front end view of the vehicle. Assume further that the vehicle makes a right turn at a relatively high rate of speed. The resulting lateral movement of the wheels 10 and 12 and the cross-bars 34 and 36 to the left in FIG. 1 relative to the vehicle body pivots lever 40 clockwise and pushes the actuator 64 of valve 66 into the valve. The outlet C1 and inlet C2 of the valve are connected to the hydraulic cylinder 50 so that hydraulic fluid is pumped into the top of the cylinder, forcing its piston 85 downwardly along with the end of the cross-bar 34 connected thereto. This in turn prevents the vehicle body from rolling in a clockwise direction. The system is proportional in that valve 66 delivers more fluid to the top of the cylinder 50 the more the vehicle body tries to move laterally to the right relative to the wheels. Because of the geometry of the system and the design of the hydraulic circuit, the system doesn't have to stabilize, and it prevents rolling of the vehicle body from the outset of a turn. Also, the system works during a wide range of vehicle velocities.

Referring still to FIG. 1, assume that the vehicle makes a left hand turn. The wheels and cross-bars start to move laterally to the right relative to the vehicle body. This pivots lever 40 counter-clockwise, moving actuator 64 outward from the valve 66. Hydraulic fluid is then pumped into the bottom of the cylinder 50, forcing its piston upwardly along with the end of the cross-bar 34 connected thereto. This prevents the vehicle body from rolling in a counter-clockwise direction.

The spring and damper assemblies 18 and 20 function normally during turns and straight travel. If either wheel hits a bump or hole, the cylinder 50 does not have fluid pumped into it but rather reacts passively and operates as a third damper. This is desirable on rough roads. Because of the connected cross-bars and the forward steering linkage the turning of the front wheels at the start of a turn acts as an initial input to the hydraulic circuit. The system is therefore "pre-loaded" and reacts quickly to prevent rolling of the vehicle body. During turns, the body does not roll so the spring and damper assemblies still have their full degree of movement available to absorb bumps. It will be noted that the cross-bars extend transversely a substantial proportion of the lateral distance between the front wheels. Therefore the radius of up and down arcuate travel of each of the front wheels is very long. Because of this the desired anti-rolling action can be accomplished with relatively small movements of the piston inside the cylinder 50. Also there is plenty of ground clearance beneath the cross-bars.

Having described a preferred embodiment of my anti-roll suspension system, it will be apparent to those skilled in the art that my invention may be modified in both arrangement and detail. For example a different hydraulic circuit may be utilized which could include a different valve, a separate pump and multiple actuating cylinders. The system could be adapted to suspensions other than the McPherson strut type. Therefore the protection afforded by invention should only be limited in accordance with the scope of the following claims.

I claim:

1. An anti-roll system for a vehicle, comprising:
means for rotatably supporting a first wheel;
means for rotatably supporting a second wheel;
a first spring and damper assembly connecting the first wheel supporting means to a first side of a vehicle body;
a second spring and damper assembly connecting the second wheel supporting means to a second side of the body;
a first cross-bar having a first end and a second end, the first end being pivotally connected to the first wheel supporting means;
a second cross-bar having a first end and a second end, the first end being pivotally connected to the second wheel supporting means;
means for pivotally connecting the cross-bars intermediate their ends; and
control means operative during turning of the vehicle to exert forces on the cross-bars relative to the vehicle body to thereby oppose rolling of the vehicle body.

2. An anti-roll system according to claim 1 wherein the control means includes a fluid piston and cylinder assembly connecting one of the second ends of the cross-bars to the vehicle body.

3. An anti-roll system according to claim 1 wherein the control means includes a hydraulic cylinder and piston assembly pivotally connected between the second end of the first cross-bar and the vehicle body.

4. An anti-roll system according to claim 3 wherein the control means further includes a hydraulic reservoir, a quantity of a hydraulic fluid in the reservoir, a hydraulic valve, a hydraulic pump, conduit means connecting the reservoir, valve, hydraulic cylinder and piston assembly, and pump, and means for actuating the valve in response to centrifugal forces generated during cornering of the vehicle.

5. An anti-roll system according to claim 4 wherein the valve is of the variable flow type and the actuating means includes a lever having first and second ends, means for pivotally connecting the lever to the vehicle body intermediate its ends, means for pivotally connecting the first end of the lever to the second end of the second cross-bar, and means for pivotally connecting the second end of the lever to the hydraulic valve.

6. An anti-roll system according to claim 1 wherein the first and second spring and damper assemblies each comprise McPherson struts.

7. An anti-roll system according to claim 1 wherein the cross-bars extend substantially across a distance separating the first and second wheel supporting means.

8. An anti-roll system according to claim 1 wherein the first and second wheel supporting means to which the cross-bars are connected are located at a forward end of the vehicle.

9. An anti-roll system according to claim 1 and further comprising steering linkage means extending in front of and connected to the first and second wheel supporting means for simultaneously turning the first and second wheels.

10. An anti-roll system according to claim 4 wherein the pump is in a power steering mechanism of the vehicle.

11. An anti-roll system for a vehicle comprising:
means for rotatably supporting a first wheel;
means for rotatably supporting a second wheel;
a first spring and damper assembly pivotally connecting the first wheel support means to one side of a vehicle body;
a second spring and damper assembly pivotally connecting the second wheel support means to the other side of the body;
a first cross-bar having a first end and a second end, the first end being pivotally connected to the first wheel supporting means;
a second cross-bar having a first end and a second end, the first end being pivotally connected to the second wheel wheel supporting means;
means for pivotally connecting the first and second cross-bars intermediate their ends;
a hydraulic cylinder and piston assembly pivotally connected at a first end to the second end of the first cross-bar and pivotally connected at a second end to the vehicle body;

a hydraulic pump;

variable flow hydraulic valve means having a movable actuator;

a reservoir;

a quantity of hydraulic fluid in the reservoir; means for connecting the second end of the second cross bar to the actuator of the hydraulic valve means;

conduit means for connecting the pump, the reservoir, and the hydraulic piston and cylinder assembly; and the valve means being operable for directing the hydraulic fluid to and from the hydraulic cylinder and piston assembly upon movement of the actuator by lateral movement of the first and second cross-bars relative to the vehicle body during turning of the vehicle to thereby oppose rolling of the vehicle body.

12. An anti-roll system according to claim 11 wherein the hydraulic pump is in a power steering mechanism of the vehicle.

13. An anti-roll system according to claim 11 wherein the hydraulic valve means varies the flow of hydraulic fluid to and from the hydraulic piston and cylinder assembly in proportion to the amount of lateral movement of the cross-bars relative to the vehicle body.

14. An anti-roll system according to claim 11 wherein the first and second cross-bars each extend substantially across a distance between the wheel supporting means.

15. An anti-roll system according to claim 11 wherein the first and second spring and damper assemblies each comprise McPherson struts.

16. An anti-roll system according to claim 11 and further comprising steering linkage means extending in front of and connected to the first and second wheel supporting means for simultaneously turning the first and second wheels.

17. An anti-roll system according to claim 11 and further comprising a first compression strut pivotally connecting the first end of the first cross-bar to a first lower portion of the vehicle body and a second compression strut pivotally connecting the first end of the second cross-bar to a second lower portion of the vehicle body.

18. An anti-roll system according to claim 11 wherein the hydraulic cylinder and piston assembly includes an outlet port normally sealed by the piston when the wheels are in a neutral position relative to the vehicle body and the conduit means includes a hydraulic return line connecting the outlet port and the reservoir.

19. An anti-roll system according to claim 11 wherein the means for connecting the second end of the second cross-bar to the actuator of the hydraulic valve means includes a lever, means for pivotally connecting an intermediate portion of the lever to a lower portion of the vehicle body, means for pivotally connecting a lower end of the lever to the second end of the second cross-bar and means for pivotally connecting an upper end of the lever to the actuator.

20. An anti-roll system according to claim 11 and further comprising means for causing the hydraulic valve means to be actuated on entering a turn.

* * * * *